(12) United States Patent
Clark

(10) Patent No.: US 7,025,560 B2
(45) Date of Patent: Apr. 11, 2006

(54) FRANGIBLE COUPLING

(75) Inventor: Brynley Clark, Bristol (GB)

(73) Assignee: Rolls-Royce, plc, London (GB)

( * ) Notice: Subject to any disclaimer, the term of this patent is extended or adjusted under 35 U.S.C. 154(b) by 1 day.

(21) Appl. No.: 10/600,443

(22) Filed: Jun. 23, 2003

(65) Prior Publication Data

US 2004/0006967 A1   Jan. 15, 2004

(30) Foreign Application Priority Data

Jul. 12, 2002   (GB) .................................. 0216312

(51) Int. Cl.
*F01B 25/16*   (2006.01)
*F01D 21/00*   (2006.01)

(52) U.S. Cl. ........................... 415/9; 416/2; 60/39.091; 60/223; 403/2

(58) Field of Classification Search ................... 415/9; 416/2; 60/39.091, 223, 226.1; 403/2
See application file for complete search history.

(56) References Cited

U.S. PATENT DOCUMENTS

| 3,205,024 | A | * | 9/1965 | Morley et al. ............... 384/582 |
|---|---|---|---|---|
| 3,659,877 | A | * | 5/1972 | Kubasta ......................... 285/3 |
| 4,086,012 | A |   | 4/1978 | Buckley et al. |
| 4,375,906 | A |   | 3/1983 | Roberts et al. ............. 384/490 |
| 6,068,452 | A | * | 5/2000 | Okada et al. .................. 403/2 |
| 6,079,200 | A |   | 6/2000 | Tubbs ....................... 60/226.1 |
| 6,428,269 | B1 |   | 8/2002 | Boratgis et al. |

FOREIGN PATENT DOCUMENTS

| EP | 1 314 858 A2 | 10/2002 |
|---|---|---|
| FR | 2 752 024 A1 | 2/1998 |
| GB | 888116 | 1/1962 |
| GB | 0 928 250 A | 6/1963 |
| GB | 1 199 441 A2 | 4/2002 |

* cited by examiner

*Primary Examiner*—Theresa Trieu
(74) *Attorney, Agent, or Firm*—Oliff & Berridge, PLC

(57) ABSTRACT

A frangible coupling for interconnecting parts comprising a first ring and a second ring coaxially arranged relative to each other and axially joined via an annular array of fuse ligaments equidistantly spaced apart from each other. The ligaments are configured to fail when an abnormal radial load of a predetermined value causes the first and second ring to move out of their coaxial relationship. When all of the fuse ligaments are severed, the communication between the first and second rings is severed. This allows the first ring to move independently of the second ring, preventing the out of balance load on the first ring being communicated to the second ring.

13 Claims, 4 Drawing Sheets

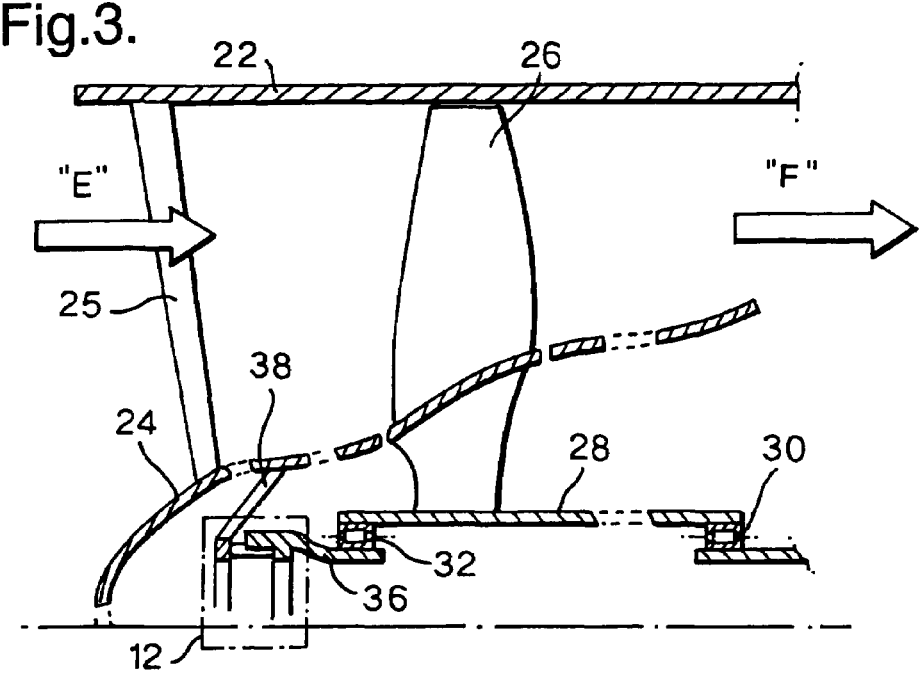
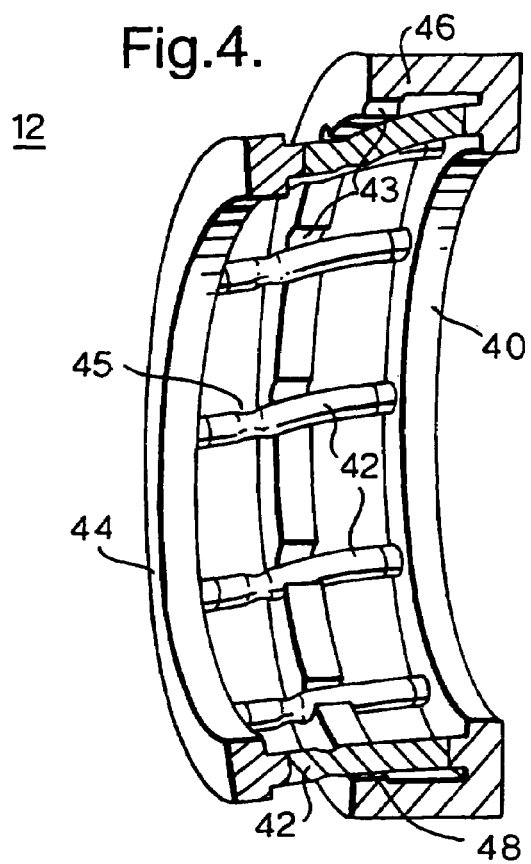

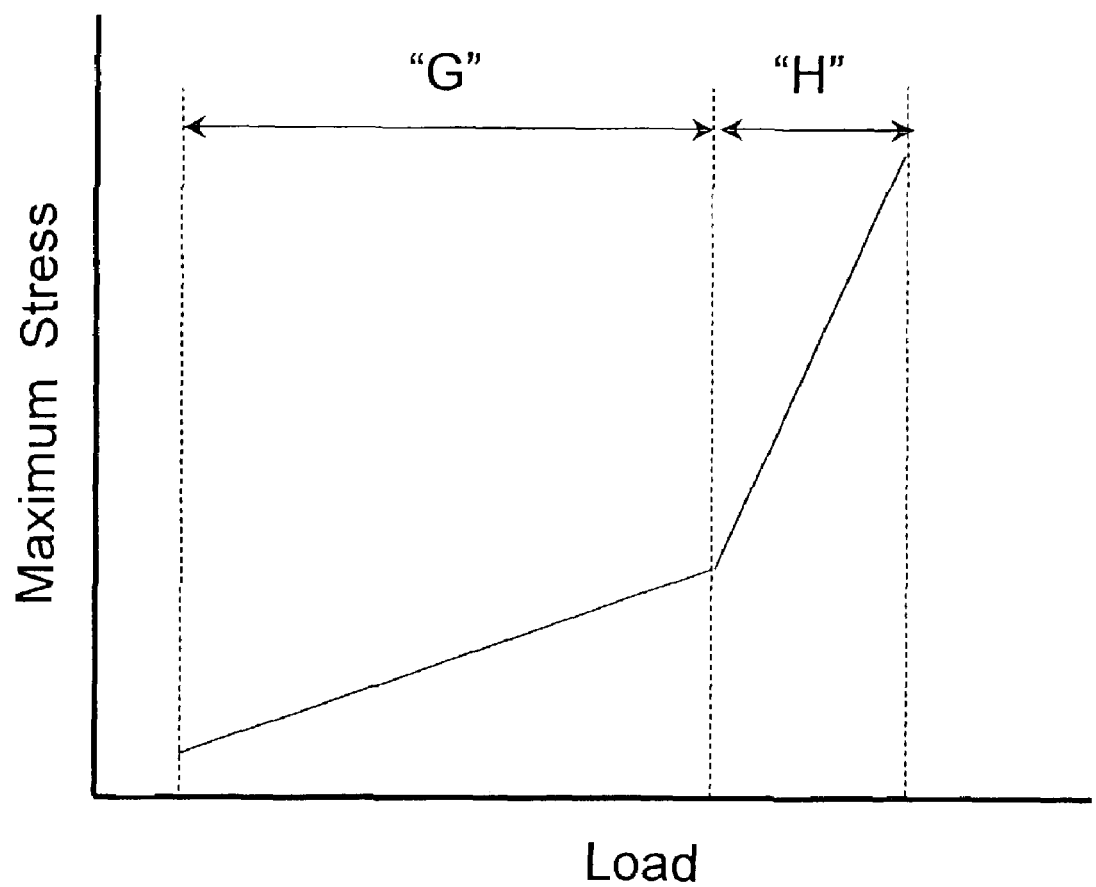

FRANGIBLE COUPLING

BACKGROUND

The invention relates to a frangible coupling. In particular it refers to a frangible coupling for turbo machinery.

In a conventional gas turbine engine, the fan is used for pressurising ambient air which then passes downstream to a compressor to be further compressed. The air is then mixed with fuel in a combustor, ignited and burned to expand the gas, further increasing the gas pressure before exhausting via a turbine from which energy is extracted. The engine may have a high pressure turbine which powers the compressor, and a low pressure turbine which powers the fan.

Other engines utilise power off takes, perhaps directly from one of the turbine stages, to drive independent fans to generate propulsive thrust remote from the propulsion unit.

The fan typically comprises an annular array of large fan blade rotors that extend radially outward from a supporting disc. The fan is fixedly joined to a shaft and is rotatable about the axis of the shaft, which is rotatably supported by a number of bearings in communication with a static fan support structure. The concentric alignment of the fan within a surrounding fan casing is maintained by the bearings. The bearings also act as a means to transmit aerodynamic, centrifugal and vibratory loads into the fan support structure. During normal operation the fan is dynamically balanced.

In the rare event of the loss of a section of a blade, perhaps because of foreign object damage or failure of the rotor blade material, there may be a substantial rotary imbalance introduced into the fan system. This will be transmitted to the fan support structure. If the engine is fitted to an aircraft, this may lead to undesirable vibrations being transmitted to the airframe body. In extreme cases the aircraft may become difficult to handle or suffer severe structural damage.

The engine may be turned off to prevent unnecessary damage to itself and the airframe. However, whilst in flight, there may be no means to stop the aerodynamic windmilling of the damaged engine, which may be enough to cause a substantial imbalanced load and further damage.

Likewise, if the fan is driven remotely from the engine it may be desirable to run the damaged fan to generate propulsion. A common requirement is to be able to run the fan up to a predetermined imbalance load, thereby coping with a proportion of blade loss. The fan should only be taken out of use when the imbalance load reaches a certain unacceptable level. It may not be possible for a pilot to make this judgement, requiring some safety feature of the fan to sever the connection between the imbalanced load and the fan structure.

In order to accommodate the possibility of such abnormal radial loads the supporting components for the fan may be strengthened. This may have the undesirable effect of increasing the size, weight and expense of the fan structure. Means for the controlled buckling of various parts of engine structure have also been utilised.

Another solution is the introduction of a coupling placed between the bearing support structure and the fan support structure that de-couples when the imbalance reaches a predetermined level. Such a device is frequently referred to as a structural fuse or a frangible coupling. When decoupled the connection between the bearing support and support structure is severed, leaving the fan supported by its shaft and at one end by a bearing.

Conventional structural fuses are designed to de-couple above relatively low abnormal radial loads. However, an increasingly common requirement is for the fan to carry on rotating and generating useful thrust with a degree of out of balance loading.

The fuse has two conflicting requirements. It must withstand any fatigue or normal operational loads but fail reliably under the increased fan blade off load. This presents a load range within which the fuse must be designed. The extra requirement that the fuse not fail under partial fan blade off but fail under full blade off makes the design window prohibitively narrow.

Fuse designs exist that utilise shear bolts and spigots that fasten the supporting components of the fan together. However, given the tolerances inherent in the design and materials used, it is not possible to define accurately at what load the fuse will severe the connection. Hence the fuse may sever the connection when the imbalance is below the required lower level, resulting in premature decoupling, or above the higher level, resulting in damage to the fan structure, engine or aircraft.

According to the present invention there is provided a frangible coupling for the purpose of supporting a rotatable load having a first ring, a second ring, a plurality of ligaments and a load magnification member, said first ring and second ring interconnected by said plurality of ligaments, with the load magnification member provided on the first ring or rotatable load, there being a small clearance maintained between said member and ligaments adjacent thereto, configured such that, in use, when a load of a predetermined value causes the first and second ring to move relative to one another by a predetermined amount, thereby bringing at least one ligament into contact with said load magnification member, at least one ligament is caused to fail.

Preferably the first ring is formed with a flange that is provided with a plurality of semi-circular cross-section cut out portions each of which corresponds closely to the outside diameter of the ligaments part way along the ligaments, thereby defining a small clearance between the ligaments and their corresponding cut out portions in the flange.

Preferably at least one ligament is formed with a stress raising feature in the region where it is designed to contact the flange when a load of a predetermined value causes the first and second ring to move relative to one another by a predetermined amount.

Preferably the frangible coupling is configured such that at a predetermined out of balance loading induced by the rotatable load at least one ligament is brought into contact with the flange, thereby increasing the stress concentration in the at least one ligament to a level where the at least one ligament fails.

The invention provides an internal support structure for rotatable turbo machinery components that will fail when subjected to out of balance forces imparted to the structure caused by a fan blade off or partial fan blade off. The stress raising feature within the fuse accelerates the fracture process, breaking the fuse within a narrower and predictable loading range. This allows the rotor to orbit closer to its new centre of gravity and either transmit a reduced load by a secondary route, or removes the load path altogether.

In commonly used aerospace metals there is a linear relationship between load applied and stress induced. This invention employs a means whereby when the load raises to a certain level, the rate of change of stress in the material suddenly is increased, inducing fracture within a much smaller and predictable load range. The stresses acting on the ligaments are magnified, causing them to fail at lower loads than they otherwise would.

This load magnification at high loads enables the ligaments to be designed for a long fatigue life at low loads whilst failing positively at higher loads.

BRIEF DESCRIPTION OF THE DRAWINGS

The invention and how it may be constructed and operated, will now be described in greater detail with reference, by way of example, to an embodiment illustrated in the accompanying drawings, in which:

FIG. 3 shows a schematic representation of the relevant section of a fan, illustrating the location of the frangible coupling relative to the rotatable components;

FIG. 4 shows a first embodiment of the frangible coupling;

FIG. 7 is a diagrammatic representation of the relationship between load applied and stress induced in the frangible coupling.

DETAILED DESCRIPTION OF PREFERRED EMBODIMENTS

Figure 1:
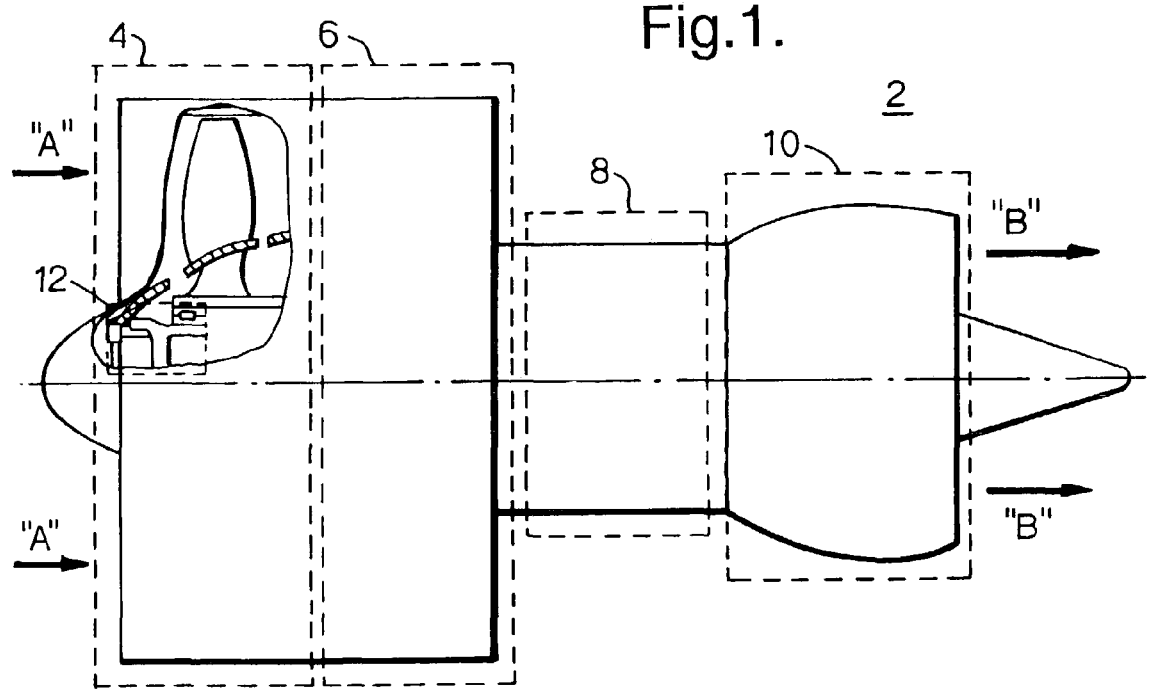
FIG. 1 is a pictorial representation of a typical gas turbine engine.

FIG. 1 illustrates the main sections of a gas turbine engine 2. The overall construction and operation of the engine 2 is of a conventional kind, well known in the field, and will not be described in this specification beyond that necessary to gain an understanding of the invention. For the purposes of this description the engine is divided up into four sections—a fan section 4, a compressor section 6, a combustor section 8 and a turbine section 10. Air, indicated generally by arrow "A", enters the engine 2 via the fan section 4. The air is compressed and moves downstream to the compressor 6. This further pressurises the air, a proportion of which enters the combustion section 8, the remainder of the air being employed elsewhere. Fuel is injected into the combustor airflow, which mixes with air and ignites before exhausting out of the rear of the engine, indicated generally by arrow "B", via the turbine section 10. A cutaway reveals the location of a frangible coupling 12.

Figure 2:
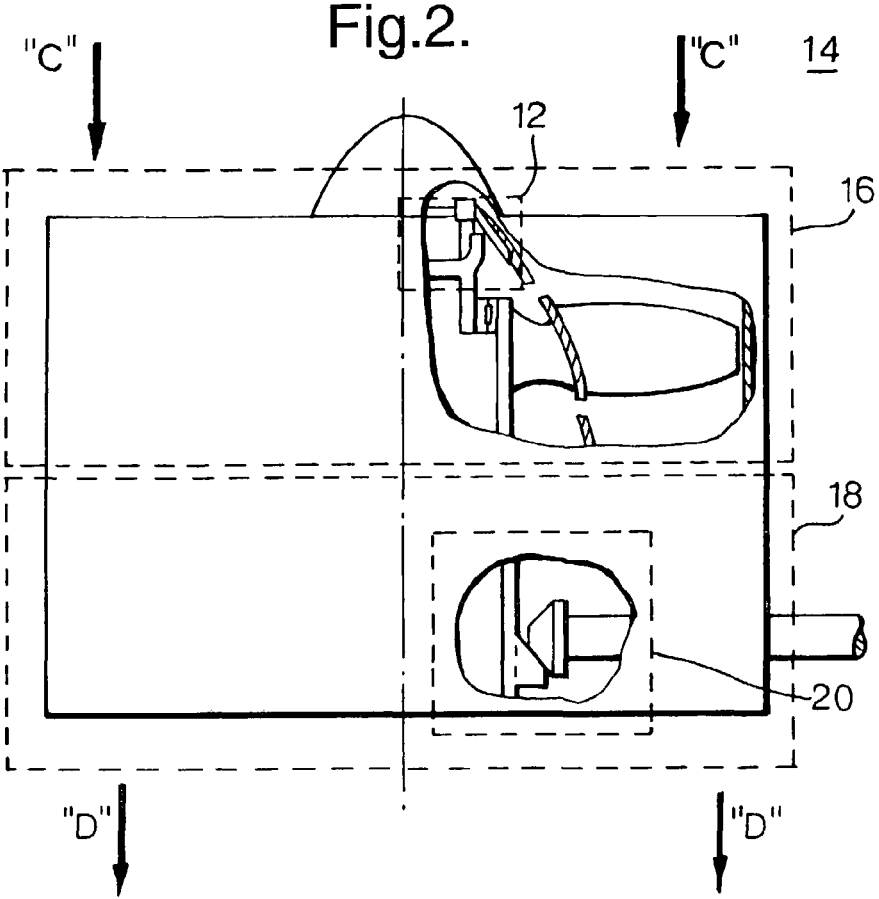
FIG. 2 is a pictorial representation of a fan powered remotely from an engine.

FIG. 2 illustrates a fan unit 14 that is driven remotely from an engine. It does not provide compressed air to the engine but is used to generate propulsive thrust remote from the propulsion unit. In FIG. 2 the fan unit 14 is shown mounted with its central axis vertical. This is only one embodiment, drawn here for illustrative purposes. The fan unit may be mounted in any orientation.

For the purposes of this description the fan unit 14 is divided up into 3 sections—a fan rotor section 16, a compressor section 18 and a drive shaft and gearing arrangement 20, the latter being shown in a cutaway view. Air, indicated generally by arrow "C", enters the fan unit 14 via the fan rotor section 16. The air is compressed and moves downstream to compressor 18, where it is further pressurised before being exhausted from the fan 14, indicated generally by arrow "D". A cutaway reveals the location of the frangible coupling 12.

An enlarged view of fan assembly common to the engine 2 and fan unit 14 is presented in FIG. 3. Air, indicated generally by arrow "E", enters the fan unit 14, constrained on one side by an outer wall 22 and on the other by a discontinuous inner wall 24. Support for the inner wall 24 is provided by an array of support members 25 which extend radially towards, and are in communication with, the outer wall 22. The inner wall 24 comprises several static and rotatable sections, the details of which are not required here to appreciate the invention. The air is pressurised by an annular array of fan rotor blades 26 and then passes downstream, as indicated generally by arrow "F".

The fan blades 26 are fixedly joined to a shaft 28 that is rotatable about the central axis of the fan unit 14. The shaft 28 is rotabably supported by bearings 30 and 32 at the downstream and upstream ends respectively. The bearing 32 is supported by the nonrotatable frangible coupling 12 via a first static member 36. The coupling 12 is in communication with a non-rotatable section of the inner wall 24 via a second static member 38.

FIG. 4 shows an enlarged view of the frangible coupling 12, with the first member 36 and second member 38 removed for clarity. The frangible coupling 12 comprises a first ring 40 axially joined via a row of generally circular cross section fuse ligaments 42 to a second ring 44.

The first ring 40 is formed with a flange 46 that is provided with semi-circular cross-section cut out portions 43 that correspond closely to the outside diameter of the ligaments 42 part way along their length. A small clearance 48 is maintained between the ligaments 42 and their corresponding cut out portions 43 in the flange 46. The fuse ligaments 42 are equidistantly spaced apart from each other and are formed with a stress raising feature 45, which, as shown here, may take the form of a narrowed waist.

In normal use the primary load path from the fan shaft 28 is through the support bearing 32, and then through the coupling 12 to the inner wall 24, transmitted then to the support members 25 which communicate it to the outer wall 22.

Under high out of balance loads the ligaments 42 deflect, the clearance 48 closes and the flange 46 forms part of the secondary load path. The flange 46 acts as a load magnifacation member, and hence a consequence of the out of balance nature of the loading is that the ligament 42 in contact with the flange 46 will carry significantly more load than the other ligaments. This results in the rapid failure of the ligament 42 in contact with the flange 46. Since the applied load is rotating the adjacent ligament 42 quickly becomes loaded in a similar way and also fails. This process is repeated until all of the ligaments 42 have failed. With the ligaments 42 severed, the first ring 40 is free to move independently of the second ring 44, allowing the out of balance shaft 28 to oscillate about a new axis, which will result in less damage to the engine support casing than if the out of balance force was transmitted through to the inner wall 24.

Figure 5:
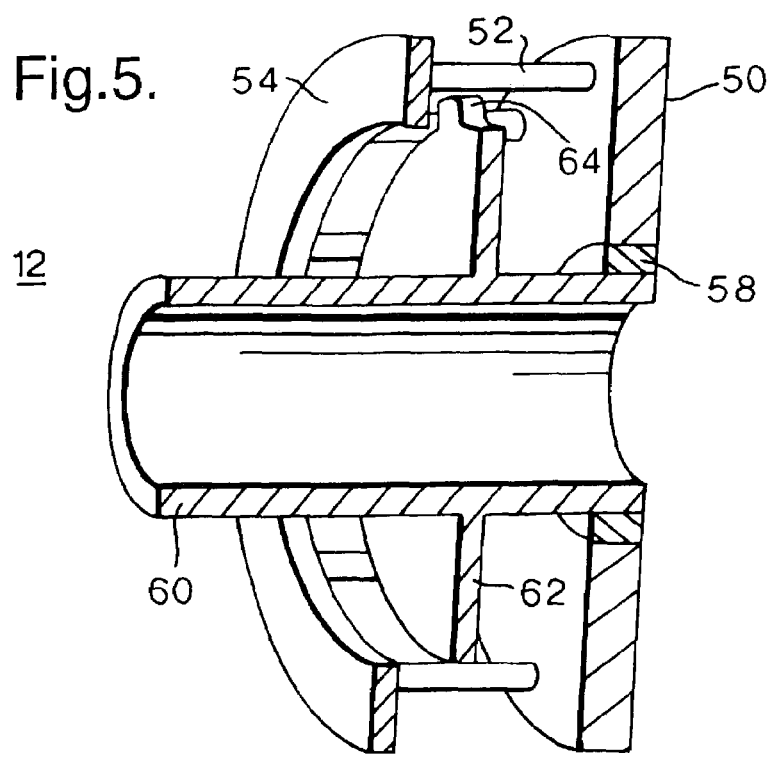
FIG. 5 shows a second embodiment of the frangible coupling.

FIG. 5 presents an alternative embodiment of the frangible coupling 12. The coupling 12 comprises a first ring 50 axially joined via a row of fuse ligaments 52 to a second ring 54. The second ring 54 is formed with a third static member 56 (not shown) that is fixedly joined with a non rotatable section of the inner wall 24 (not shown in this figure). The first ring 50 is fitted with a bearing 58 that rotatably supports the first ring 50 on a shaft 60. The shaft 60 supports the fan blades 26 (not shown in this figure). The shaft 60 is provided with a disc 62 positioned at about one half of the way between the first ring 50 and the second ring 54. Extending radially outward from the circumference of the disc 62 is a snub 64 which, in use, acts as a load magnifacation member.

Figure 6:
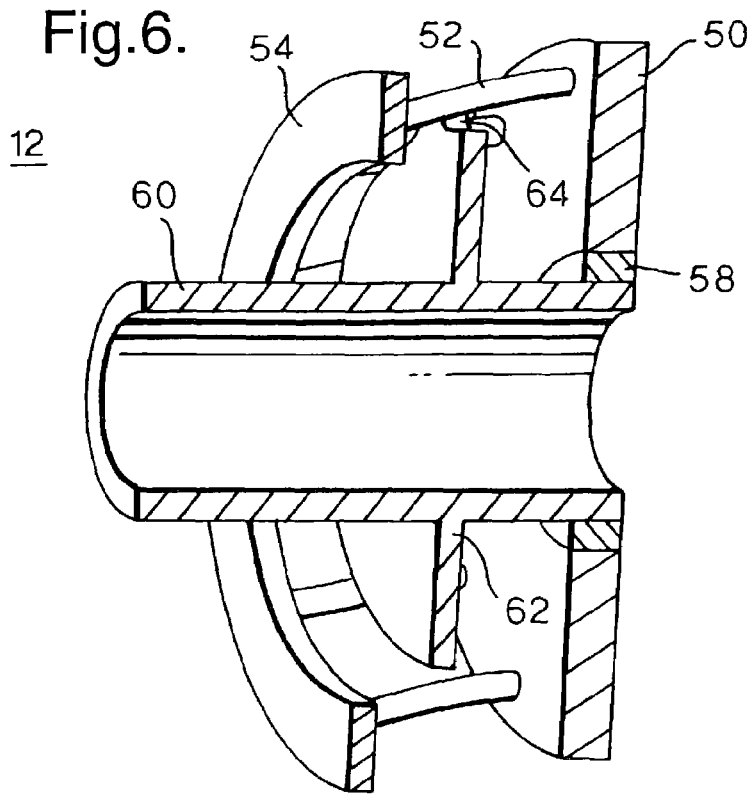
FIG. 6 shows the second embodiment distorted by an out of balance force, the distortion is exaggerated for clarity.

In normal in balance operation the blades 26 rotate and cause only small deflections of the shaft 60. When subjected to abnormally high radial loads the shaft 60 will oscillate, transmitting the oscillation to the bearing 58 and the first ring 50, causing the ligaments 52 to deflect, as shown in FIG. 6 (exaggerated). The relative movement of the ligaments 52 and the snub 64 causes them to impact each other as the snub 64 rotates. The impact is sufficient to cause the failure of the ligaments 52. The first ring 50 will be forced to oscillate with the rotating out of balance load, resulting in the snub 64 impacting on all of the fuse ligaments 52, breaking them in turn and ultimately severing the connection between the first ring 50 and the second ring 54. This allows the first ring 50 to move independently of the second ring 54, allowing the out of balance shaft 60 to oscillate about its new axis, resulting in less damage to the support casing of the fan unit 14 than if the out of balance force was transmitted through to the inner wall 24.

During normal operation in both embodiments the fuse ligaments 52 experience an increase in stress proportional to the load imposed by the rotating load. This is indicated by section "G" of the graph in FIG. 7. When an abnormal radial load is applied the stress is increased locally in at least one of the fuse ligaments 52, increasing the stress per unit force at the critical location on the ligament 52, indicated by section "H" on the graph. Hence the overall relationship between the load imparted to the first ring 40,50 and stress induced in the fuse ligaments 52 is non linear. The sudden increase in fuse ligament stress enables a better control over the loading at which the ligament 52 will fail.

The failure of some, but not all, of the ligaments 52 may enable the coupling 12 to accommodate the out of balance load where the more rigid structure provided by the coupling 12, when all ligaments 52 are intact, would not sufficiently dampen the excessive oscillation.

The configurations shown in FIGS. 1, 2, 3, 4, 5 and 6 are diagrammatic. The design and positioning of the frangible coupling, rotor blades, bearings, fan casing and other parts may vary. Likewise the combination and configuration of these components will vary between designs. The relationship presented in FIG. 7 is an approximation.

The invention claimed is:

1. A frangible coupling for the purpose of supporting a rotatable load having a first ring, a second ring, a plurality of ligaments and a load magnification member, said first ring and second ring interconnected by said plurality of ligaments with the load magnification member provided on the first ring or rotatable load, there being a small clearance maintained between said member and ligaments adjacent thereto, configured such that, in use, when a load of a predetermined value causes the first and second ring to move relative to one another by a predetermined amount, thereby bringing at least one ligament into contact with said load magnification member, at least one ligament is caused to fail.

2. A frangible coupling as claimed in claim 1 wherein the said ligaments are substantially axially aligned.

3. A frangible coupling as claimed claim 1 wherein the first and second rings are cylindrical.

4. A frangible coupling as claimed in claim 1 wherein the ligaments are equidistantly spaced apart.

5. A frangible coupling as claimed in claim 1 wherein the first ring and the second ring are coaxial.

6. A frangible coupling as claimed in claim 1 wherein the first ring and the second ring are concentric.

7. A frangible coupling as claimed in claim 1 wherein the load magnification member on the first ring is formed as a flange that is provided with a plurality of semi-circular cross-section cut out portions each of which corresponds closely to at least part of the outside diameter of a ligament part way along the ligaments, there being a small clearance maintained between the ligaments and their corresponding cut out portions in the flange.

8. A frangible coupling as claimed in claim 7 wherein at least one ligament is formed with a stress raising feature in the region where, when a load of a predetermined value causes the first and second ring to move relative to one another by a predetermined amount, the at least one ligament is designed to contact the flange thereby increasing the stress concentration in the at least one ligament to a level where the at least one ligament fails.

9. A frangible coupling as claimed in claim 7 wherein each of the ligaments have at least one waisted section.

10. A frangible coupling as claimed in claim 7 wherein the first ring is in communication with a means for supporting a rotatable load.

11. A frangible coupling as claimed in claim 10 wherein the second ring is fixedly joined to a fan support structure.

12. A frangible coupling as claimed in claim 1 wherein a rotatable shaft is in communication with said first ring via a bearing support means, the load magnification member is a rotatable member on the rotatable shaft positioned between and coaxially with the first and second ring, thereby defining a small clearance between the said member and the ligaments adjacent thereto, such that when a load of predetermined value causes the first and second ring to move relative to one another by a predetermined amount, the at least one ligament is designed to contact the member thereby increasing the stress concentration in the at least one ligament to a level where the at least one ligament fails.

13. A frangible coupling as claimed in claim 12 wherein the rotatable member is a disc formed with at least one snub which extends substantially radially outward from the rotatable member, there being a small clearance maintained between the said snub and the ligaments adjacent thereto.

* * * * *